Figure 1:
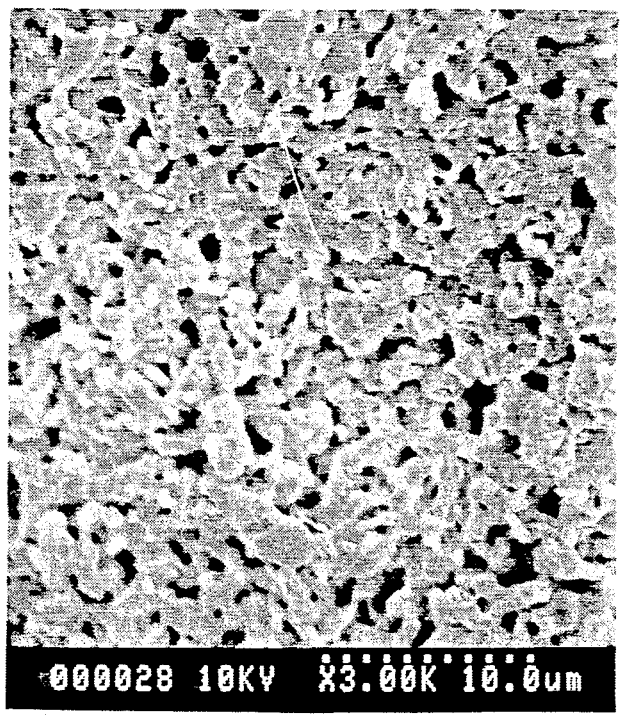

United States Patent [19]

Oomura et al.

[11] Patent Number: 5,256,615
[45] Date of Patent: Oct. 26, 1993

[54] GRANULAR INORGANIC EXCHANGERS

[75] Inventors: Takuya Oomura, Tokyo; Hideki Kato, Tokushima; Nobuhiko Aiba, Aichi; Noriyuki Yamamoto, Aichi; Toshiro Hirose, Aichi; Kenichi Ishizaki, Aichi, all of Japan

[73] Assignee: Toagosei Chemical Industry, Co., Ltd., Tokyo, Japan

[21] Appl. No.: 879,740

[22] Filed: May 6, 1992

Related U.S. Application Data

[63] Continuation of Ser. No. 766,977, Sep. 27, 1991, abandoned, which is a continuation of Ser. No. 538,254, Jun. 14, 1990, abandoned.

[30] Foreign Application Priority Data

Jun. 21, 1989 [JP] Japan .................................. 1-158531
Jun. 21, 1989 [JP] Japan .................................. 1-158532

[51] Int. Cl.⁵ ........................ B01J 20/12; B01J 20/22
[52] U.S. Cl. .................................. 502/62; 502/84
[58] Field of Search .................................. 502/62, 84

[56] References Cited

U.S. PATENT DOCUMENTS

| | | | |
|---|---|---|---|
| 3,235,512 | 2/1966 | Koepernik | 502/63 |
| 4,591,455 | 5/1986 | Macedo et al. | 252/629 |
| 4,629,713 | 12/1986 | Suzuki et al. | 502/62 |
| 4,737,316 | 4/1988 | Macedo et al. | 252/633 |
| 4,775,461 | 10/1988 | Harris et al. | 502/84 |
| 4,792,539 | 12/1988 | Yamanaka et al. | 502/84 |
| 4,839,318 | 6/1989 | Kawase et al. | 502/62 |

FOREIGN PATENT DOCUMENTS

| | | | |
|---|---|---|---|
| 1080084 | 4/1960 | Fed. Rep. of Germany . | |
| 62-297211 | 12/1987 | Japan . | |
| 1-087509 | 3/1989 | Japan | 502/63 |

OTHER PUBLICATIONS

Applied Clay Mineralogy by Grim, McGraw-Hill Book Co., Inc. New York, Toronto, London (1962) pp. 29-32.

Primary Examiner—Carl F. Dees
Attorney, Agent, or Firm—Henry T. Burke

[57] ABSTRACT

Disclosed is a granular inorganic ion exchanger which is obtained by firing at 400° C. or higher a granular molded product of a mixture of a metal alkoxide such as Si(OMe)$_4$ or hydrolyzate thereof, a clay mineral such as sepiolite and an inorganic ion exchanger such as antimony pentoxide and which has mechanical strength and heat resistance without losing its inherent ion exchangeability.

7 Claims, 1 Drawing Sheet

GRANULAR INORGANIC EXCHANGERS

This application is continuation application of application Ser. No. 07/766,977 filed Sep. 27, 1991 and now abandoned, which is a continuation of application Ser. No. 07/538,254 filed Jun. 14, 1990 and now abandoned.

The present invention relates to granular inorganic ion exchangers excellent in heat resistance, mechanical strength and ion exchanging characteristics and useful for recovery of impurities or valuable materials.

At present, ion exchange resins are widely used as granular ion exchangers, but they have the defect that they cannot be used at high temperature because of their low heat resisting temperature (lower than 60° C.).

On the other hand, inorganic ion exchangers are superior in stability under high temperature or strong radiation to ion exchange resins and can be expected to be applied to ion exchange treatment in water of high temperature and separation, concentration and purification of strong radiation materials.

However, inorganic ion exchangers are generally obtained in the form of fine powder. Therefore, when inorganic ion exchangers are used by packing in a column, inorganic ion exchangers of fine powder must be molded into suitable size and shape to reduce resistance against passing of liquid. Furthermore, the inorganic ion exchangers must have mechanical strength high enough to stand operations such as back washing and regeneration.

Inorganic ion exchangers can be molded to granules using organic binders such as cellulose and synthetic polymers. When organic binders are used, the granular product is insufficient in heat resistance to result in fusion between granules and rupture of granules by ion exchange treatment at high temperature.

In order to utilize sufficiently the heat resistance of inorganic ion exchangers, they are preferably molded to granules using inorganic binders and processes to mold them to granules using water glass, clay minerals and the like have been known.

However, conventional granular inorganic ion exchangers obtained using inorganic binders, when their mechanical strength is enhanced, are much deteriorated in ion exchange characteristics such as ion exchange capacity and ion exchange rate as compared with powdery ion exchangers. Thus, such ion exchangers are not practical and to the contrary, when powdery inorganic ion exchangers are molded to granules without causing deterioration of ion exchange characteristics, mechanical strength is not enough to be practically used. Thus, granular inorganic ion exchangers of practical level in all of heat resistance, mechanical strength and ion exchange characteristics have not yet been obtained.

The object of the present invention is to solve the above-mentioned problems of conventional granular inorganic ion exchangers molded using inorganic binders and provide granular inorganic ion exchangers excellent in heat resistance, mechanical strength and ion exchange characteristices.

As a result of intensive research conducted by the inventors, it has been found that the above problems can be solved by using a clay mineral and a metal alkoxide or its hydrolyzate in combination as inorganic binders and excellent granular inorganic ion exchangers can be obtained. Thus, the present invention has been accomplished.

That is, the present invention relates to granular inorganic ion exchangers obtained by firing a granular mixture comprising a metal alkoxide or its hydrolyzate, a clay mineral and an inorganic ion exchanger.

Figure 2:
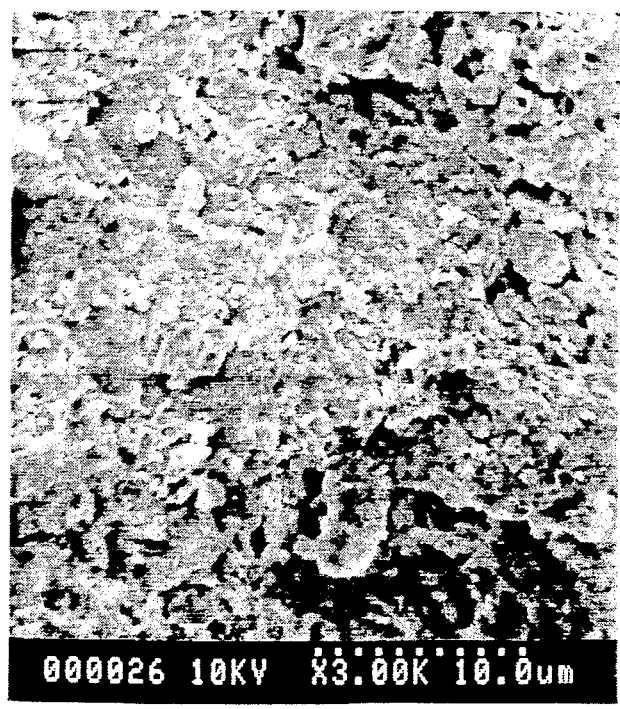

In the accompanying drawings,

FIG. 1 is a scanning electron micrograph which shows granular structure of granular inorganic ion exchangers produced in Example 1 and FIG. 2 is a scanning electron micrograph which shows granular structure of granular inorganic ion exchangers produced in Comparative Example 2.

Respective components used in the present invention and method for obtaining granular products using these components will be explained below.

Inorganic Ion Exchangers

Inorganic ion exchangers of the present invention are not critical as far as they are water-insoluble inorganic compounds which show ion exchangeability in water. As water-insoluble inorganic compounds which show cation exchangeability, mention may be made of antimony trioxide, antimony pentoxide, hydrous antimony oxide (V), titanium antimonate, zirconium antimonate, tin antimonate, iron antimonate, aluminum antimonate, chromium antimonate, tantalum antimonate, manganese antimonate, bismuth anitimonate, phosphoantimonic acid, antimonotungstic acid, ammonium antimonomolybdate, zirconium phosphate, bismuth phosphate, titanium phosphate, tin phosphate, vanadium pentoxide, hydrous vanadium pentoxide, titanium vanadate, alluminum vanadate, zirconium vanadate, phosphovanadic acid, vanadinomolybdenic acid, vanadium ferrocyanate, niobium pentoxide, hydrous niobium pentoxide, tantalum pentoxide, hydrous tantalum pentoxide, tantalum phosphate, ferrous hydroxide, aluminum hydroxide, manganese oxide, [for example, one obtained by firing manganese nitrate ($Mn(NO_3)_2 \cdot 6H_2O$) at 150°-190° C.], hydrous manganese oxide and manganese compounds obtained by firing manganese oxide which contain alkali metal ion or alkaline earth metal ion at high temperature and then eluting the alkali metal ion or alkaline earth metal ion by acid treatment. As water-insoluble inorganic compounds which show anion exchangeability, mention may be made of lead hydroxyapatite, cadmium hydroxyapatite, hydrotalcite, bismuth trioxide, bismuth pentoxide, hydrous bismuth oxide (III), hydrous bismuth oxide (V), and bismuth hydroxynitrate (III). Further, as water-insoluble inorganic compounds which show ampho-ion exchangeability, mention may be made of hydrous zirconium oxide, hydrous titanium oxide, hydrous tin oxide and hydrous lead oxide. These compounds may be used as a mixture of two or more, if necessary.

Especially the inorganic ion exchangers which are represented by the following formula are suitable for recovering lithium from liquid containing lithium such as sea water and underground water by selectively adsorbing lithium ion and then eluting it.

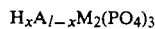

$$H_xA_{l-x}M_2(PO_4)_3$$

(wherein x is a positive number of less than 1, A is at least one element selected from Li, Na and K, and M is at least one element selected from Zr, Ti and Sn).

Process for preparation of the inorganic ion exchangers represented by by the above formula is disclosed, for example, in "Material Research Bulletin", vol. 12, p171-182, 1977 and "Acta. Chemica. Scand.", Vol. 22, p1822-1832, 1968. For example, at least one salt containing the element A in the above formula, such as lithium carbonate ($Li_2CO_3$), sodium carbonate ($Na_2CO_3$) and potassium carbonate ($K_2CO_3$), at least one salt containing the element M, such as zirconium oxide ($ZrO_2$), titanium oxide ($TiO_2$) and tin oxide ($SnO_2$), and a phosphate such as ammonium dihydrogenphosphate [$NH_4H_2PO_4$] or ammonium phosphate [$(NH_4)_3PO_4$] are mixed at a molar ratio of about 1:4:6 and the mixture is fired at 1100°-1400° C., preferably 1300° C. to obtain $AM_2(PO_4)_3$. This compound is subjected to acid treatment by immersing it in an inorganic acid such as hydrochloric acid or nitric acid at room temperature $-100$ ° C. to replace the element A with proton and then is dried. Thus, this compound can be easily obtained.

Value of the x can be controlled by concentration of acid, temperature and treating time in the acid treatment. In fact, it is very difficult to replace all of the element A with proton by such acid treatment and very slight amount of the element A remains and so the x is a positive number of less than 1. In order to increase ion exchange capacity of proton and lithium, value of the x is preferably 0.5 or more, more preferably 0.8 or more.

The compounds of inorganic ion exchangers may have any structures such as crystalline, amorphous and glassy structures and may have any forms. However, usually easily available powder form is preferred and its particle size is preferably 0.01-100 μm, more preferably 0.1-10 μm. If particle size is less than 0.01 μm, powders per se agglomerate or surface of powders is covered with binders, which may cause deterioration of ion exchange characteristics. If particle size is more than 100 μm, contact area with binders is small and so granular products having high mechanical strength may not be obtained.

Clay Minerals

Clay minerals used in the present invention are hydrous silicate compounds which possess plasticity and which shrink to enhance their mechanical strength when dried or fired. Examples thereof are bentonite, kaolin, sepiolite, diatomaceous earth, kubushi clay, gairome clay and the like.

Clay minerals in which their water of hydration can be free therefrom at a low temperature are preferred, because it is usual in this case that a granular inorganic ion exchanger can be obtained by firing even at a low temperature.

Clay minerals are divided into the following two categories depending upon structure: phyllosilicates which have a layered structure and contain between the layers exchangeable ions such as alkali metals and alkaline earth metals, and inosilicates which have a double-chain structure and contain no exchangeable ions.

Among them, inosilicates are preferred, because inorganic ion exchangers are not heat-decomposed when granules are fired in accordance with the step described later, and inosilicates provide granular inorganic ion exchangers which are superior in ion exchange properties, particularly ion exchange rate to phyllosilicates.

Examples of inosilicates are palygorskite, attapulgite, sepiolite and the like. Among them, sepiolite is especially preferred because it has a high plasticity-providing ability.

Amount of clay minerals is preferably 1-70 parts by weight, more preferably 2-40 parts by weight per 100 parts by weight of inorganic ion exchangers. (Hereinafter, "part by weight" will be referred to as merely "part".). If the amount is less than 1 part, mechanical strength of granular inorganic ion exchangers decreases and if it is more than 70 parts, no further significant improvement of mechanical strength can be obtained and there may occur deterioration of ion exchange characteristics.

Metal Alkoxides or Hydrolyzates thereof

Metal alkoxides used in the present invention are compounds prepared by substituting a metal for hydrogen of hydroxyl group of alcohols and examples thereof are $Si(OR)_4$, $Ti(OR)_4$, $Al(OR)_4$ and $Zr(OR)_4$ (wherein R is an alkyl group such as methyl, ethyl, propyl and butyl). Among them, alkoxides of silicon are preferred because they have lower hydrolyzing rate than alkoxides of aluminum, titanium and zirconium and can be easily converted to stable sol.

Hydrolyzates of metal alkoxides used in the present invention can be prepared by conventional processes For example, refer to Sumio Sakuhana's "Science of Sol-Gel", pages 8-24, Agne Sofusha, (1988)] and are in the form of organosol or organogel depending on degree of progress of hydrolysis and polymerization reaction of metal alkoxides in solvent. It is preferred to use the hydrolyzates in the form of organosol for easy kneading in granulation step referred to hereinafter.

In the present invention, either metal alkoxides or hydrolyzates thereof can be used, but it is preferred to use a partially hydrolyzated product of metal alkoxides for shortening of kneading time in granulation step referred to hereinafter.

The solvents for metal alkoxides include alcohols such as methanol, ethanol, propanol, and butanol, ethylene glycol, ethylene oxide, triethanolamine, xylene, formamide, dimethylformamide, dioxane and oxyalic acid. Preferred are alcohols.

Optimum amount of metal alkoxides or hydrolyzates thereof varies depending on kinds and amounts of inorganic ion exchangers and clay minerals, but may be 1-60 parts, preferably 1-30 parts, more preferably 1-20 parts in terms of solid content of metal alkoxides or hydrolyzates thereof (i.e., amount in terms of weight of metal oxides produced from metal alkoxides) per 100 parts of inorganic ion exchangers. If amount is less than 1 part, ion exchange characteristics of granular inorganic ion exchangers are deteriorated and if it is more than 60 parts, mechanical strength of granular inorganic ion exchangers tends to decrease.

Molding Method

The granular inorganic ion exchangers of the present invention can be obtained by molding through general molding steps of blending, mixing.kneading, granulating, and firing.

First, mixing kneading step is explained. In mixing.kneading step, respective components: i.e., inorganic ion exchangers, clay minerals, metal alkoxides or hydrolyzates thereof, and water are mixed. Sequence of mixing is optional and the components may be uniformly mixed. One example of mixing.kneading operations is that clay minerals are added to inorganic ion exchangers and they are uniformly mixed in a kneader and then metal alkoxides or hydrolyzates thereof and a suitable amount of water are added to the mixture and they are wet-mixed. The water added is a component added for easy mixing.kneading and amount of water varies depending on kinds and particle size of inorganic ion exchangers, and kinds and amounts of clay minerals and metal alkoxides or hydrolyzates thereof, but usually is 1-100 parts, preferably 1-50 parts per 100 parts of solid content in slurry. The resulting slurry is further kneaded for several hours—one day in a kneader or the like.

Granulation method is also not critical, but it is preferred to use extrusion granulating method which is superior in yield and reproducibility in industrial scale. The resulting granules are desirably subjected to dressing to spheres by ordinary centrifugal rotation method.

Thereafter, the dressed granules are fired and imparted with sufficient mechanical strength, thereby to obtain the desired granular inorganic ion exchangers. Firing conditions vary depending on kinds and particle size of inorganic ion exchangers and kinds and amounts of clay minerals and metal alkoxides or hydrolyzates thereof, but it is preferred that maximum firing temperature is usually 400 °C. or higher but lower than melting point of inorganic ion exchangers and retention time of the maximum firing temperature is 1-8 hours, preferably 2-6 hours. If firing temperature is lower than 400 °C., mechanical strength of granular inorganic ion exchangers decreases and if it is higher than melting point of inorganic ion exchangers, granules per se fuse to each other or in some case ion exchange characteristics are much deteriorated.

Method for Recovery of Lithium

One example of utilizations of the inorganic ion exchangers is to recover lithium by the inorganic ion exchangers. Liquid from which lithium can be recovered has no limitation as far as it contains lithium and includes, for example, natural water such as sea water, natural gas brine, underground hot water, or hot spring water, brine for manufacture of common salt, industrial waste liquor and waste liquor containing organic solvent.

Temperature of the lithium-containing liquid is not critical as far as it is in the form of liquid, but generally adsorption rate of lithium tends to increase with increase in temperature of the lithium-containing liquid and so the temperature of the lithium-containing liquid is preferably higher as far as no difficulty is encountered in operation.

Moreover, pH value of lithium-containing liquid is preferably 12 or less, but if pH is less than 4, an adsorption amount of lithium tends to decrease and so more preferred pH range is 5-11.

Contact of inorganic ion exchangers with lithium-containing liquid can be performed by either batch-wise method or continuous method and separation of inorganic ion exchangers from lithium-containing liquid after completion of contact can be carried out by common solid-liquid separation means.

Inorganic ion exchangers which have adsorbed lithium are separated in the above manner and are allowed to contact with eluents to elute lithium from inorganic ion exchangers, thereby to recover lithium.

Inorganic acids such as hydrochloric acid, sulfuric acid, nitric acid and phosphoric acid are used as the eluent and these may be used singly or as a mixture of two or more. Besides, these inorganic acids may be used in combination with aqueous ammonium salt solution.

As conditions for elution, desorption rate of lithium tends to increase with increase in concentration and temperature of eluents and increase in treating time. However, a treating temperature around room temperature suffice if any limitation in operation is present.

Action:

Although detailed mechanism is not clear, it is considered that crystal growth of inorganic ion exchangers by firing is restrained due to the presence of metal alkoxides or hydrolyzates thereof and besides, volatile substances contained in the metal alkoxides or hydrolyzates thereof are volatilized at the firing and as a result, granular inorganic ion exchangers have a large specific surface area and have uniform porous structures. Then. granules excellent in ion exchange characteristics and high in mechanical strength can be obtained.

The present invention will be explained by the following examples.

First, sol of metal alkoxides was prepared in the following manner.

Reference Example 1

40 g of Silicate 40 (manufactured by Tama Kagaku Kogyo Co., a partially hydrolyzed product of ethyl silicate), 60 g of ethanol, 7.0 g of water (120 % of theoretical amount required for hydrolysis) and 1.0 g of strongly acidic ion exchange resins (IR-120B-H type) were mixed in a 300 ml three-necked flask. The mixture was refluxed at 80 °C. for 2 hours using a heating mantle, then cooled and filtrated to remove the strongly acidic ion exchange resins, whereby a silica sol of 15 % in solid content (hereinafter abbreviated to "NV") was prepared.

EXAMPLE 1

500 g of lead hydroxyapatite of 0.7 $\mu$m in average particle size obtained by sedimentation method (which is applied to measurement of particle size given hereinafter) as inorganic ion exchangers, 55 g of bentonite as clay minerals, 120 g of water and 560 g of silica sol obtained in Reference Example 1 were mixed and kneaded by a kneader for 2 hours (rotation speed: 100 rpm).

The resulting kneaded product was granulated by an extrusion granulating machine with twin-screw and a screen of 0.5 mm$\phi$ set at side face of tip of screw (screw speed: 20 rpm) to obtain rod-like granules of 0.5 mm$\phi$.

The resulting rod-like granules were put in a grain dresser having a rotating plate at the bottom of a cylindrical container and the rotating plate was rotated at 700 rpm for 30 minutes to obtain granules by rotating motion of the rod-like granules accompanying collison with side inner surface of the cylindrical container.

The granules were fired in an electric furnace at 800 °C. for 2 hours and then cooled to obtain granular inorganic ion exchangers having a particle size of 0.3-0.6 mm. The granules had a specific surface area of 2.3 m$^2$/g measured by BET method (FIG. 1).

Ion exchange capacity of the resulting granular inorganic ion exchangers determined by 0.1N HCl was 0.5 meq/g. When 1 g of the granular inorganic ion exchangers were introduced into a separating funnel together with 100 ml of water and shaken by a shaker at 100 times/min, neither crushing nor powdering of the granular inorganic ion exchangers occurred.

Furthermore, 1.0 g of the resulting granular inorganic ion exchangers and 100 ml of 1/100N aqueous HCl solution were mixed in a polyethylene container and shaken by a shaker. Shaking time and amount of Cl$^-$ ion adsorbed to the granular inorganic ion exchangers in this case were measured and ion exchange rate of the granular inorganic ion exchangers was evaluated. The results are shown in Table 1.

Further, ion exchange capacity at 60° C. and 150° C. of the granular inorganic ion exchangers containing lead hydroxyapatite was measured. Measuring conditions and the results are shown in Table 2.

TABLE 1

| | Ion exchange amount (meq) | | | | |
|---|---|---|---|---|---|
| | After 1 minute | After 6 minutes | After 12 minutes | After 30 minutes | After 24 hours |
| Example 1 | 0.11 | 0.15 | 0.20 | 0.24 | 0.35 |
| Comparative Example 2 | 0.00 | 0.00 | 0.03 | 0.03 | 0.11 |

TABLE 2

| Granular inorganic ion exchanger | Prepared in Example 1 | |
|---|---|---|
| Temperature of water (°C.) | 60 | 150 |
| Test liquid | 1/100 N HCl | |
| Method of contact with test liquid | Shaking for 24 hours | Leaving for 72 hours (6 atm.) |
| Ion exchange capacity (meq/g) | 0.53 | 0.35 |

EXAMPLE 2

Granular inorganic ion exchangers having the same particle size as that of the ion exchangers obtained in Example 1 were obtained in the same manner as in Example 1 except that hydrotalcite having an average particle size of 7 μm was used as inorganic ion exchangers and gairome clay was used as a clay mineral. Ion exchange capacity and mechanical strength of the resulting granular inorganic ion exchangers were evaluated and the results are shown in Table 3.

COMPARATIVE EXAMPLE 1

Granular inorganic ion exchangers having the same particle size as that of the granular ion exchangers obtained in Example 1 were obtained in the same manner as in Example 1 except that bentonite was omitted. Mechanical strength of the resulting granular inorganic ion exchangers was evaluated as in Example 1 to find that the granular inorganic ion exchangers was crushed and powdered.

COMPARATIVE EXAMPLE 2

Granular inorganic ion exchangers having the same particle size as that of the granular ion exchangers obtained in Example 1 were obtained in the same manner as in Example 1 except that silica sol was omitted. Specific surface area of the granular ion exchangers measured by BET method was less than 0.1 m²/g (FIG. 2). Ion exchange capacity, mechanical strength and ion exchange rate of the resulting granular ion exchangers were evaluated as in Example 1 and the results are shown in Tables 1 and 3.

EXAMPLE 3

Granules were obtained in the same manner as in Example 1 except that 500 g of hydrous antimony oxide (V) having an average particle size of 0.5 μm on which potassium was adsorbed was used as inorganic ion exchangers and 125 g of kaolin was used as clay mineral and silica sol obtained in Reference Example 1 was used in an amount of 315 g. Furthermore, potassium contained in the resulting granules was ion-exchanged with proton using 0.1N HCl to obtain granular inorganic ion exchangers having the same particle size as that of the product in Example 1.

Ion exchange capacity of the resulting granular inorganic ion exchangers was obtained using 0.1N NaOH and mechanical strength thereof was evaluated as in Example 1. The results are shown in Table 3.

COMPARATIVE EXAMPLE 3

Granular inorganic ion exchangers having the same particle size as that of the product in Example 1 were obtained in the same manner as in Example 3 except that kaolin was omitted. Mechanical strength of the resulting granular inorganic ion exchangers was evaluated as in Example 1 to find that the granular ion exchangers were crushed and powdered.

COMPARATIVE EXAMPLE 4

Granular inorganic ion exchangers having the same particle size as in Example 1 were obtained in the same manner as in Example 3 except that silica sol was omitted. Ion exchange capacity and mechanical strength thereof were evaluated and the results are shown in Table 3.

EXAMPLE 4

Granular inorganic ion exchangers having the same particle size as in Example 1 were obtained in the same manner as in Example 3 except that tin phosphate having an average particle size of 2.6 μm on which sodium was adsorbed was used as inorganic ion exchangers, bentonite was used as clay mineral and firing time was 5 hours. Ion exchange capacity and mechanical strength thereof were evaluated and the results are shown in Table 3.

EXAMPLE 5

Granular inorganic ion exchangers having the same particle size as in Example 1 were obtained in the same manner as in Example 3 except that zirconium phosphate having an average particle size of 0.5 μm on which sodium was adsorbed was used as inorganic ion exchangers and gairome clay was used as clay mineral. Ion exchange capacity and mechanical strength were evaluated and the results are shown in Table 3.

EXAMPLE 6

Granular inorganic ion exchangers having the same particle size as in Example 1 were obtained in the same manner as in Example 5 except that titanium phosphate having an average particle size of 0.7 μm on which sodium was adsorbed was used as inorganic ion exchangers and ion exchange capacity and mechanical strength thereof were evaluated. The results are shown in Table 3.

EXAMPLE 7

Granular inorganic ion exchangers having the same particle size as in Example 1 were obtained in the same manner as in Example 5 except that zirconium phosphate having an average particle size of 0.5 μm on which lithium was adsorbed was used as inorganic ion exchangers and ion exchange capacity and mechanical strength were evaluated. The results are shown in Table 3.

EXAMPLE 8

Granular inorganic ion exchangers having the same particle size as in Example 1 were obtained in the same manner as in Example 3 except that an acid-treated manganese compound obtained by immersing manganese dioxide in aqueous magnesium chloride solution (1M), drying the immersed manganese dioxide, firing the dried product at 600 °C. and then treating the fired product with 0.1N aqueous hydrochloric solution was used as inorganic ion exchangers and gairome clay was used as clay mineral. Ion exchange capacity and mechanical strength thereof were evaluated and the results are shown in Table 3.

EXAMPLE 9

Granular inorganic ion exchangers having the same particle size as in Example 1 were obtained in the same manner as in Example 1 except that 15 g of sepiolite was used as clay mineral, silica sol prepared in reference Example 1 was used in an amount of 50 g, firing temperature was 550 °C. and firing time was 4 hours. Ion exchange capacity and mechanical strength were evaluated and the results are shown in Table 3.

Furthermore, 1.0 g of the above-obtained granular inorganic ion exchangers and 100 ml of 1/100N aqueous HCl solution were mixed in a polyethylene container and shaken by a shaker. Shaking time and amount of Cl ion adsorbed on the granular inorganic ion exchangers in this case were measured and ion exchange rate of the granular inorganic ion exchangers was evaluated. The results are shown in Table 4.

TABLE 4

| | Ion Exchange amount (meq) | | | | |
|---|---|---|---|---|---|
| | After 1 minute | After 6 minutes | After 12 minutes | After 30 minutes | After 24 hours |
| Example 9 | 0.15 | 0.21 | 0.25 | 0.31 | 0.48 |

In addition, a performance of the ion exchangers in a column was evaluated by charging a column of 2 cm in diameter with the above-obtained granular inorganic ion exchangers to the height of 20 cm, introducing a 10 mg-Cl/liter aqueous solution of hydrogen chloride into the column from its upper end under the conditions shown below, and measuring how long it took $Cl^-$ ions to come out of the bottom end of the column. The results are shown in Table 9.

| Conditions | |
|---|---|
| Flow rate | Temperature |
| 100 cm/hour | 30° C. |

COMPARATIVE EXAMPLE 5

Granular inorganic ion exchangers were obtained in the same manner as in Example 4 except that bentonite was not used. Mechanical strength of the resulting granular inorganic ion exchangers was evaluated as in Example 1 to find that crushing and powdering occured.

COMPARATIVE EXAMPLE

Granuar inorganic ion exchangers were obtained in the same manner as in Example 3 except that silica sol was not used. Ion exchange capacity and mechanical strength thereof were evaluated and the results are shown in Table 3.

TABLE 3

| | Inorganic ion exchanger | | Clay mineral | | Metal alkoxide | | Ion exchange capacity (meq/g) | Mechanical strength *4 |
|---|---|---|---|---|---|---|---|---|
| | Kind *1 | Amount (Part) | Kind *2 | Amount (Part) | Kind *3 | Amount (Part) | | |
| Example 2 | HYT | 500 | KMN | 55 | SiS | 560 | 2.8 | ○ |
| Example 3 | HSb | 500 | KOL | 125 | SiS | 315 | 2.0 | ○ |
| Example 4 | PSn | 500 | BTN | 125 | SiS | 315 | 0.8 | ○ |
| Example 5 | PZr | 500 | KMN | 125 | SiS | 315 | 1.2 | ○ |
| Example 6 | PTi | 500 | KMN | 125 | SiS | 315 | 3.4 | ○ |
| Example 7 | PZr | 500 | KMN | 125 | SiS | 315 | 1.3 | ○ |
| Example 8 | HMn | 500 | KMN | 125 | SiS | 315 | 0.7 | ○ |
| Example 9 | PbA | 500 | SPL | 15 | SiS | 50 | 0.5 | ○ |
| Comparative Example 1 | PbA | 500 | — | — | SiS | 560 | — | X |
| Comparative Example 2 | PbA | 500 | BTN | 55 | — | — | 0.1 | ○ |
| Comparative Example 3 | HSb | 500 | — | — | SiS | 315 | — | X |
| Comparative Example 4 | HSb | 500 | KOL | 125 | — | — | 0.3 | ○ |
| Comparative Example 5 | PSn | 500 | — | — | SiS | 315 | — | X |
| Comparative | PSn | 500 | BTN | 125 | — | — | 0.1 | ○ |

TABLE 3-continued

| | Inorganic ion exchanger | | Clay mineral | | Metal alkoxide | | Ion exchange capacity (meq/g) | Mechanical strength *4 |
|---|---|---|---|---|---|---|---|---|
| | Kind *1 | Amount (Part) | Kind *2 | Amount (Part) | Kind *3 | Amount (Part) | | |
| Example 6 | | | | | | | | |

*1
HYT: Hydrotalcite
HSb: Hydrous antimony oxide (V)
PSn: Tin phosphate
PZr: Zirconium phosphate
PTi: Titanium phosphate
HMn: Acid-treated manganese compound
PbA: Lead hydroxyapatite
*2
KOL: Kaolin
BTN: Bentonite
KMN: Gairome clay
SPL: Sepiolite
*3
SiS: Silica sol
*4
○: Neither crushing nor powdering occurred.
X: Crushing and powdering occurred.

REFERENCE EXAMPLE 2

1 g of $LiZr_2(PO_4)_3$ (compound (II)) obtained by mixing lithium carbonate, zirconium oxide and ammonium phosphate at a given ratio and firing the mixture was stirred overnight in 100 ml of 2N hydrochloric acid at 100° C., then filtrated and washed with water and dried at 110° C. overnight to obtain inorganic ion exchangers of the above formula where A was Li, M was Zr and x was 0.9.

COMPARATIVE EXAMPLE 7

0.1 g of powdery inorganic ion exchangers obtained in Reference Example 2 were added to 2 ( of natural sea water (lithium concentration: 0.17 mg/(), followed by stirring for 24 hours. Then, the powders were collected by filtration, washed, dried and then subjected to elution with 5N hydrochloric acid. Adsorption amount of lithium and concentrating rate of lithium were obtained by measuring concentration of lithium in the hydrochloric acid. Concentrating rate was calculated by the following formula.

$$\text{Concentrating rate} = \frac{\text{Adsorption amount (mg/g)}}{\text{Concentration of lithium in sea water (mg/ml)}}$$

Similarly, adsorption amount and concentrating rate were obtained on alkali metals and alkaline earth metals other than lithium in natural sea water and the results are shown in Table 4.

TABLE 5

| Element | Concentration in sea water (mg/ml) | Adsorption amount (mg/g) | Concentrating rate |
|---|---|---|---|
| Li | $0.17 \times 10^{-3}$ | 3.39 | $2.0 \times 10^4$ |
| Na | $1.05 \times 10$ | <0.01 | <0.1 |
| K | 0.38 | <0.01 | <0.1 |
| Mg | 1.35 | <0.01 | <0.1 |
| Ca | 0.40 | <0.01 | <0.1 |

It can be seen from Table 5 that $H_xLi_{1-x}Zr_2(PO_4)_3$ (x=0.9) is extremely high in concentrating rate for lithium as compared with alkali metals and alkaline earth metals other than lithium and markedly efficient recovery of lithium from natural sea water can be attained by using it.

COMPARATIVE EXAMPLE 8

1 g of inorganic ion exchangers obtained in Reference Example 2 was added to 2 l of underground hot water (lithium content: 5.2 mg/l), followed by stirring for 24 hours. Then, the inorganic ion exchangers were collected by filtration, washed with water, and dried. Adsorption amount of lithium was obtained by measuring lithium concentration in filtrate The inorganic ion exchangers were dried, then immersed in 100 ml of 5N hydrochloric acid and kept at 80° C. for 3 hours to elute lithium. Using the same inorganic ion exchangers, the above operation of recovery of lithium comprising adsorption and elution was repeated 5 times and adsorption amount, adsorption rate and desorption rate of lithium were obtained by measuring lithium concentration in filtrate and in hydrochloric acid in each operation of recovery. The results are shown in Table 6.

It can be seen from Table 6 that in case of the method of recovery of lithium which uses $H_xLi_{1-x}Zr_2(PO_4)_3$ (x=0.9), capability to recover lithium does not decrease even when adsorption and elution of lithium are repeated.

TABLE 6

| | The number of repetition | | | | |
|---|---|---|---|---|---|
| | 1 | 2 | 3 | 4 | 5 |
| Li adsorption amount (mg/g) | 10.2 | 10.2 | 10.2 | 10.2 | 10.2 |
| Li adsorption rate (%) *1 | 98 | 98 | 98 | 98 | 98 |
| Li desorption rate (%) *2 | 99 | 99 | 99 | 99 | 99 |

*1 Li adsorption rate = [Weight of lithium adsorbed (mg/weight of lithium in underground hot water (mg)] × 100
*2 Li desorption rate = [Weight of lithium desorbed (mg)/weight of lithium adsorbed (mg)] × 100

EXAMPLE 10

500 g of inorganic ion exchangers obtained in Reference Example 2, 55 g of bentonite as clay mineral, 120 g of water and 560 g of silica sol (solid contet: 15 %, solvent: ethanol) prepared from ethyl silicate as metal alkoxide hydrolyzate were kneaded for 2 hours in a kneader (rotation speed: 100 rpm). This kneaded product was granulated by an extrusion granulating machine with twin-screw and a screen of 0.5 mmφ set at face side of tip of screw (screw rotation speed: 20 rpm) to obtain rod-like granules of 0.5 mmφ.

The resulting rod-like granules were introduced into a grain dresser having a rotating plate at the bottom of a cylindrical container and the rotating plate was rotated at 700 rpm for 30 seconds to obtain spheres of 0.5 mm$\phi$. The spheres were fired in an electric furnace at 800° C. for 2 hours.

1 g of the fired spheres were stirred in 20 ( of sea water for 24 hours, filtrated, washed and dried. Then, lithium was eluted with 5N hydrochloric acid and lithium concentration in hydrochloric acid was measured and adsorption amount of lithium and concentrating rate were obtained in the same manner as in Comparative Example 8. The results are shown in Table 7.

TABLE 7

| Element | Concentration in sea water (mg/ml) | Adsorption amount (mg/g) | Concentrating rate |
|---|---|---|---|
| Li | $0.17 \times 10^{-3}$ | 3.26 | $1.9 \times 10^4$ |
| Na | $1.05 \times 10$ | <0.01 | <0.1 |
| K | 0.38 | <0.01 | <0.1 |
| Mg | 1.35 | <0.01 | <0.1 |
| Ca | 0.40 | <0.01 | <0.1 |

Furthermore, 1 g of the fired spheres were put in a separating funnel (250 ml) together with 100 ml of hot water of 90° C. and shaken by a shaker at 100 times/min for 30 minutes, but crushing and powdering did not occur and the shape was retained.

From the above, it can be seen that $H_xLi_{1-x}Zr_2(PO_4)_3$ ($x=0.9$) molded into spheres using an inorganic binder shows substantially no reduction in ion exchange characteristics and besides, can be used for column-packing method because of high mechanical strength.

EXAMPLE 11

Spheres were prepared in the same manner as in Example 10 except that $LiZr_2(PO_4)_3$ was used as inorganic ion exchangers. 1 g of the resulting spheres were immersed in 500 ml of 0.5N hydrochloric acid and kept at 80° C. for 3 days and then filtrated, washed and dried.

1 g of these spheres were added to 20 l of sea water and adsorption amount as in Example 10 and the results are shown in Table 8.

Furthermore, 1 g of these fired spheres were shaken by a shaker as in Example 10, but crushing and powdering did not occur and no change was seen in shape.

TABLE 8

| Element | Concentration in sea water (mg/ml) | Adsorption amount (mg/g) | Concentration rate |
|---|---|---|---|
| Li | $0.17 \times 10^{-3}$ | 3.26 | $1.9 \times 10^4$ |
| Na | $1.05 \times 10$ | <0.01 | <0.1 |
| K | 0.38 | <0.01 | <0.1 |
| Mg | 1.35 | <0.01 | <0.1 |
| Ca | 0.40 | <0.01 | <0.1 |

EXAMPLE 12

Furthermore, recovery of lithium was carried out in the same manner as in Example 10 using inorganic ion exchangers obtained in Reference Example 2 where Zr was replaced with Ti or Sn and further using these inroganic ion exchangers where Li was further replaced with Na or K, and in the same manner as in Example 11 using $LiZr_2(PO_4)_3$ were Zr was replaced with Ti or Sn and further using these compounds where Li was further replaced with Na or K. In all of these cases, recovery of lithium and mechanical strength similar to those of Examples where the metal element was not replaced were recognized.

The granular inorganic ion exchangers of the present invention have much higher ion exchangeability, mechanical strength and heat resistance as compared with those which are molded into granular form using inorganic binder and are useful for treatment of water such as recovery of impurities and valuable matters in various fields.

COMPARATIVE EXAMPLE 9

A granular inorganic ion exchanger having the same particle size as in Example 1 was obtained in the same manner as in Example 9 except that 37 gram of a colloidal silica (supplied by Nissan Kagaku K. K. under the tradename of Snowlax C, silica content: 20 wt %) was used in place of the silica sol (ethyl silicate hydrolyzated sol) of Reference Example 1.

Then, a performance of the ion exchanger in a column was evaluated in the same manner as in Example 9. The result is shown in Table 9.

TABLE 9

| | Inorganic binder (solid content: wt %) | Time when Cl$^-$ comes of the bottom of the column after introduction (hour) |
|---|---|---|
| Example 9 | sepiolite (2.9) + ethyl silicate hydrolyzated sol (1.4) | 380 |
| Comparative Example 9 | sepiolite (2.9) + colloidal silica (1.4) | 210 |

We claim:

1. A granular inorganic ion exchanger which is obtained by firing a granular mixture containing a metal alkoxide or a hyrolyzate thereof, a inosilicate mineral and an inorganic ion exchanger.

2. An ion exchanger according to claim 1, wherein amount of the metal alkoxide or hydrolyzate thereof is 1-60 parts by weight in terms of metal oxide produced from said metal alkoxide or hydrolyzate thereof, and amount of clay mineral is 1-70 parts by weight, per 100 parts by weight of the inorganic ion exchanger.

3. An ion exchanger according to claim 1, wherein said metal alkoxide or hydrolyzate thereof is an alkoxide of silicon or a hydrolyzate thereof.

4. An ion exchanger according to claim 1, wherein said hydrolyzate is in the form of organosol or organogel.

5. An ion exchanger according to claim 4, wherein said hydrolyzate is in the form of organosol.

6. An ion exchanger according to claim 1, wherein said metal alkoxide or hydrolyzate thereof is a partially hydrogenated product of a metal alkoxide.

7. An ion exchanger according to claim 1, wherein said clay mineral is sepiolite.

* * * * *